United States Patent [19]

Adams et al.

[11] Patent Number: 4,616,676
[45] Date of Patent: Oct. 14, 1986

[54] TWO-WAY SELECTOR VALVE FOR A VEHICLE SEAT INFLATION DEVICE

[75] Inventors: Norman R. Adams, Angola, Ind.; Charles A. Gifford, Osseo, Mich.

[73] Assignee: Cooper Tire & Rubber Company, Auburn, Ind.

[21] Appl. No.: 634,959

[22] Filed: Jul. 27, 1984

[51] Int. Cl.[4] ............................................. F16K 11/18
[52] U.S. Cl. ............................ 137/636.4; 137/625.46; 137/871; 251/287; 285/133.1; 297/284; 297/DIG. 3
[58] Field of Search .................. 5/453, 454, 455, 456; 137/636.4, 871, 625.46; 297/200, 284, DIG. 3, DIG. 8; 251/287; 285/133 R

[56] References Cited

U.S. PATENT DOCUMENTS

| | | | |
|---|---|---|---|
| 1,315,741 | 9/1919 | Pranold | 251/287 |
| 2,938,570 | 5/1960 | Flajole | 297/DIG. 3 X |
| 3,037,526 | 6/1962 | Wheeler | 137/636.4 |
| 3,165,122 | 1/1965 | Sachnik | 251/312 X |
| 3,385,321 | 5/1968 | Ehrens | 137/625.46 |
| 3,520,327 | 7/1970 | Claydon et al. | 137/636.4 X |
| 3,867,732 | 2/1975 | Morrell | 297/284 X |
| 4,078,842 | 3/1978 | Zur | 297/284 X |
| 4,225,989 | 10/1980 | Corbett et al. | 5/455 X |
| 4,491,157 | 1/1985 | Hashimoto | 297/DIG. 3 X |

FOREIGN PATENT DOCUMENTS

| | | | |
|---|---|---|---|
| 2155058 | 5/1973 | Fed. Rep. of Germany | 297/DIG. 3 |
| 3136650 | 3/1983 | Fed. Rep. of Germany | 297/DIG. 3 |
| 1576641 | 10/1980 | United Kingdom | 297/284 |

Primary Examiner—Gerald A. Michalsky
Attorney, Agent, or Firm—Willian Brinks Olds Hofer Gilson & Lione

[57] ABSTRACT

A two-way selector valve for a vehicle seat inflation device is disclosed. The selector valve includes a first input passageway connected between a source of pressurized air and a valve body chamber. The selector valve further includes second and third passageways which are connected between the valve body chamber and respective output conduits. Each of the output conduits is connected to a respective pneumatic chamber formed in the vehicle seat. A valve plate having first and second apertures formed therein is disposed within the valve body chamber. The valve plate is rotatable between first and second positions so as to selectively provide communication between the first passageway and a selected one of the second and third passageways. A relief valve is provided adjacent the valve plate for deflating the selected one of the chambers.

28 Claims, 7 Drawing Figures

TWO-WAY SELECTOR VALVE FOR A VEHICLE SEAT INFLATION DEVICE

BACKGROUND OF THE INVENTION

The present invention relates in general to pneumatic seat cushion systems and in particular to a two-way selector valve for a vehicle seat inflation device.

BACKGROUND OF THE INVENTION

Any person who has driven an automobile or other vehicle over long distances or for lengthy periods of time has probably suffered from sore back muscles. Such back aches are caused, in part, by the impossibility of manufacturing seats which are custom fitted for each individual operator of the vehicle. Accordingly, many inflatable seat cushion and body support systems have been developed for providing a variable cushioning means within the vehicle seat. Systems of this type permit the vehicle seat to be shaped in accordance with the desires of the operator and typically include one or more pneumatic chambers disposed within the vehicle seat to accomplish this. Each of the chambers is connected to a source of pressurized air for inflation. Frequently, valve structures are provided to regulate the inflation and deflation of the chambers.

SUMMARY OF THE INVENTION

The present invention relates to a two-way selector valve for a vehicle seat inflation device. The selector valve includes a first input passageway connected between a source of pressurized air and a valve body chamber. The selector valve further includes second and third passageways which are connected between the valve body chamber and respective output conduits. Each of the output conduits is connected to a respective pneumatic chamber formed in the vehicle seat. A valve plate having first and second apertures formed therein is disposed within the valve body chamber. The valve plate is rotatable between first and second positions so as to selectively provide communication between the first passageway and a selected one of the second and third passageways. A relief valve is provided adjacent the valve plate for deflating the selected one of the chambers.

It is an object of the present invention to provide a two-way selector valve for a vehicle seat inflation device.

It is another object of the present invention to provide such a two-way selector valve which can be quickly and easily operated by a driver of the vehicle.

It is a further object of the present invention to provide such a two-way selector valve which is simple and inexpensive in construction.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
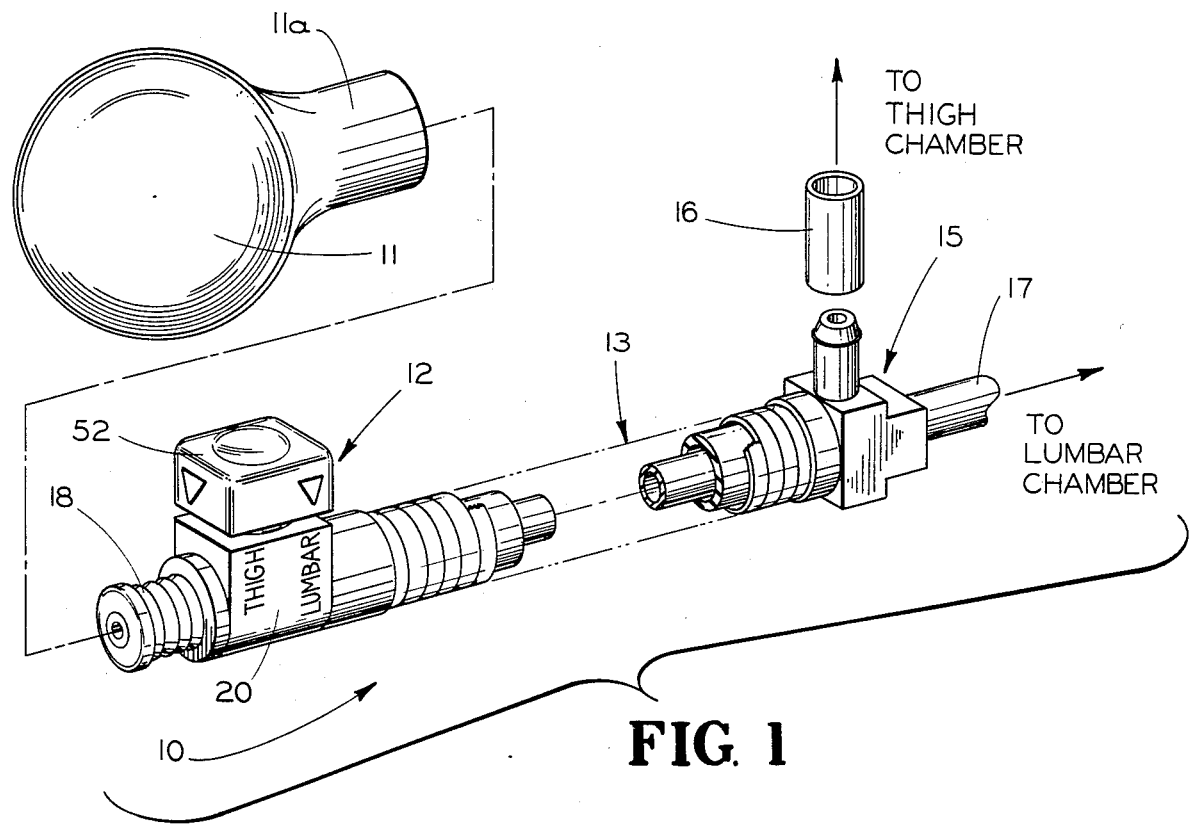
FIG. 1 is a perspective view of a vehicle seat inflation device including a two-way selector valve in accordance with the present invention.

Referring now to the drawings, there is illustrated in FIG. 1 a vehicle seat inflation device 10 in accordance with the present invention. The inflation device 10 includes a flexible bulb 11 having an open end 11a, a two-way selector valve assembly 12, conduit means 13, and a junction block 15. The bulb 11 can be replaced by any conventional source of pressurized air or other fluid. The junction block 15 is connected through two output conduits 16 and 17 to respective conventional pneumatic chambers (not shown) disposed within a seat of a vehicle. The chambers are adapted to be selectively inflated and deflated so as to provide a variable cushioning or support means within the vehicle seat to increase the comfort of the user sitting thereon. Although the chambers can be placed in virtually any location within the vehicle seat to provide support for different areas of the body, the present invention will be explained and illustrated as though the one chamber connected to the first output conduit 16 is so disposed as to provide support for the thigh region of the leg, while the other chamber connected to the second output conduit 17 is so disposed as to provide support for the lumbar region of the back.

Figure 2:
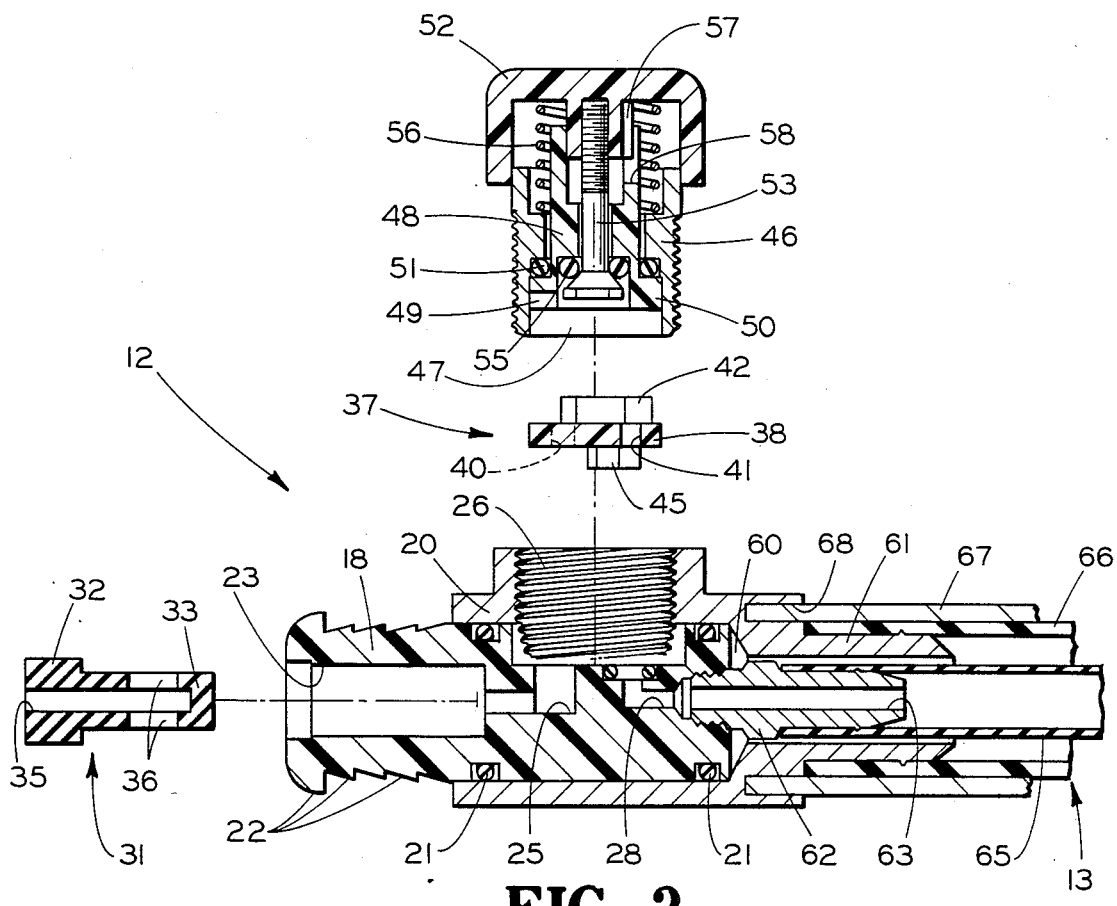
FIG. 2 is an exploded sectional elevational view of the two-way selector valve illustrated in FIG. 1.

The structure of the two-way valve assembly 12 is more clearly illustrated in FIG. 2. As shown therein, a valve spool 18 is inserted within a large aperture formed in a valve body 20. The valve spool 18 is preferably formed of a rigid plastic material. A pair of O-rings 21 are provided to insure an air-tight seal between the valve spool 18 and the valve body 20. The valve spool 18 includes a plurality of annular ramp-like projections 22 on the one end portion thereof which extend outwardly from the valve body 20. The ramp-like projections 22 are adapted to receive the open end portion 11a of the bulb 11 thereabout. In this manner, a relatively air-tight connection is achieved between the bulb 11 and the two-way valve 12, while facilitating easy removal of the bulb 11 therefrom if desired.

Figure 3:
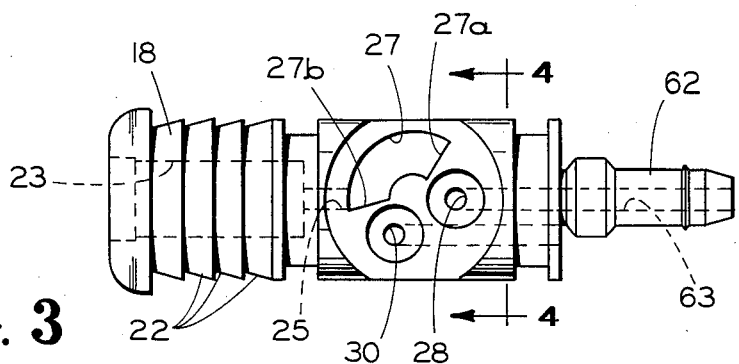
FIG. 3 is a top plan view of the valve spool of the two-way selector valve illustrated in FIG. 2.
Figure 4:
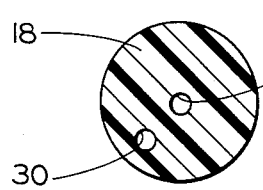
FIG. 4 is a sectional elevational view of the valve spool taken along line 4—4 of FIG. 3.

The valve spool 18 further includes an input chamber 23 formed in one end thereof, which chamber 23 is coaxially disposed within the ramp-like projections 22. The input chamber 23 communicates through a first passageway 25 to a chamber 26 formed in the valve body 20. As best illustrated in FIG. 3, the first passageway 25 enters the valve body chamber 26 through a cutout 27 formed in the shape of an annular segment in the valve spool 18. The cutout 27 includes two end portions 27a and 27b. A second passageway 28 is formed in the valve spool 18 leading from the valve body chamber 26 to the other end of the valve spool 18. FIG. 3 illustrates that a third passageway 30 is also provided between the valve body chamber 26 and the other end of the valve spool 18. As shown in FIG. 4, the second passageway 28 is disposed coaxially within the valve spool 18, while the third passageway 30 is disposed radially thereof.

Figure 7:
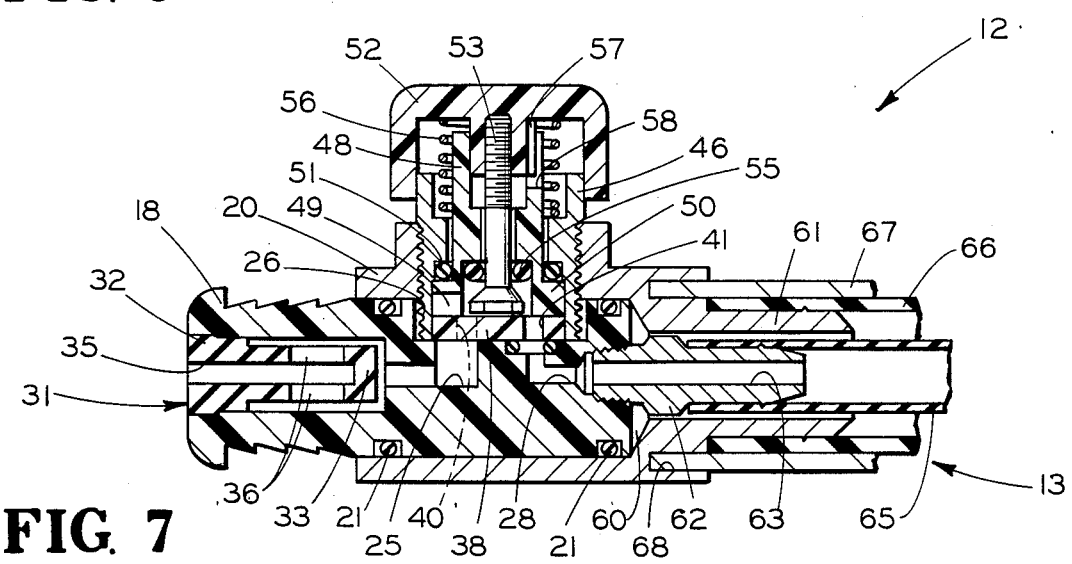
FIG. 7 is an assembled sectional elevational view of the two-way selector valve illustrated in FIG. 1 shown in a venting mode.

A check valve 31 is adapted to be inserted within the input chamber 23 formed in the one end of the valve spool 18. The check valve 31 is generally cylindrical in shape and includes an enlarged head portion 32 connected to an elongated body portion 33. An input passageway 35 is formed through the head portion 32 and partially through the body portion 33 of the check valve 31. A pair of narrow slits 36 are formed in the opposing sides of the body portion 33 in the region of the input passageway 35. The check valve 31 can be formed of any flexible plastic material such that when it is inserted within the input chamber 23 of the valve spool 18, as illustrated in FIG. 7, pressurized air is permitted to flow in the direction from the input chamber 23 to the valve body chamber 26, while such flow is prevented in the opposite direction.

Figure 5:
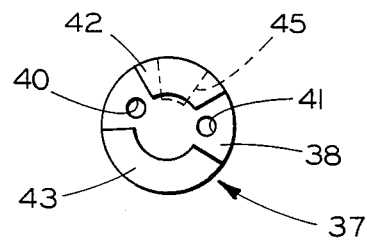
FIG. 5 is a top plan view of the valve plate illustrated in FIG. 2.

A valve plate 37 is adapted to be disposed within the valve body chamber 26 adjacent the valve spool 18. As shown in FIGS. 2 and 5, the valve plate 37 consists of a central disc-shaped body 38 having a first aperture 40 and a second aperture 41 formed therethrough. A pair of annular segment projections 42 and 43 are formed on the upper surface of the disc-shaped body 38, while a single annular segment projection 45 is formed on the lower surface thereof. The lower projection 45 is sized to fit within the cutout 27 formed in the valve spool 18 and be slidably moveable therein when the valve plate 37 is rotated relative thereto. As will be explained in greater detail below, the position of the valve plate 37 relative to the valve spool 18 determines whether the second passageway 28 or the third passageway 30 will be in communication with the first passageway 25.

A relief valve housing 46 is secured to the valve body 20 adjacent the valve plate 37. As shown in FIG. 2, the relief valve housing 46 has a threaded surface formed on the exterior thereof adapted to cooperate with a threaded surface formed on the interior of the valve body chamber 26. Thus, the relief valve housing 46 can be maintained in threaded engagement with the valve body 20. A chamber 47 is provided at the lower end of the relief valve housing 46. Within the relief valve housing 46 above the chamber 47, a valve actuator 48 is rotatably disposed. The valve actuator 48 is generally cylindrical in shape and includes a pair of downwardly-extending projections 49 and 50. The downwardly-extending projections 49 and 50 of the valve actuator 48 are adapted to fit between the upwardly-extending projections 42 and 43 of the valve plate 37 such that rotation of the valve actuator 48 causes rotation of the valve plate 37. An O-ring 51 is provided between the valve actuator 48 and the relief valve housing 46 above the projections 49 and 50 so as to maintain an air-tight seal therebetween.

A rotatable knob 52 is secured to the valve actuator 48 by means of a brass screw 53. The screw 53 extends upwardly from an enlarged head portion through a central aperture formed in the valve actuator 48 into threaded engagement with the knob 52. An O-ring 55 is provided between the enlarged head portion of the screw 53 and the body of the valve actuator 48. Between the knob 52 and the relief valve housing 46, a spring 56 is disposed about the valve actuator 48. The spring 56 urges the knob 52 upwardly such that the enlarged head portion of the screw 53 is pulled into an air-tight engagement with the O-ring 55 and the valve actuator 48. The knob 52 includes an internal key 57 which is adapted to extend into a notch 58 formed in the valve actuator 48. Thus, it can be seen that rotation of the knob 52, such as by an operator of the vehicle, causes the valve actuator 48 and the valve plate 37 to rotate therewith. The limits of such rotation are defined by the engagement of the lower projection 45 of the valve plate 37 with the ends 27a and 27b of the cutout 27 formed in the valve spool 18. The lower projection 45 acts a stop during rotation of the valve plate 37 by engaging the opposing ends 27a and 27b of the cutout 27. As will be explained in greater detail below, the valve plate 37 is movable between first and second positions to select either the second passageway 28 or the third passageway 30 for communication with the first passageway 25.

The valve body 20 further includes an output chamber 60 defined by a hollow cylindrical extension 61 formed on the side of the valve body 20 opposite from the valve spool 18. The output chamber 60 communicates with the third passageway 30. Within the cylindrical extension 61, a valve stem 62 is coaxially disposed. The valve stem 62 is threaded onto the other end of the valve spool 18. The valve stem 62 includes a central passageway 63 formed therethrough which communicates with the second passageway 25 formed in the valve spool 18.

The conduit means 13 illustrated in FIG. 1 can include a first conduit 65 and a second conduit 66. The conduits 65 and 66 can be formed of any conventional flexible hose material. The first conduit 65 is adapted to be disposed about the valve stem 62 so as to form an air-tight seal therebetween. Similarly, the second conduit 66 is adapted to be disposed about the cylindrical extension 61 so as to form an air-tight seal therebetween. If desired, an outer conduit 67 can be provided about both of the first and second conduits 65 and 66 so as to provide a protective enclosure therefore. The outer conduit 67 can consist of a flexible metallic conduit and can be frictionally secured within a recessed portion 68 of the valve body 20.

Figure 6:
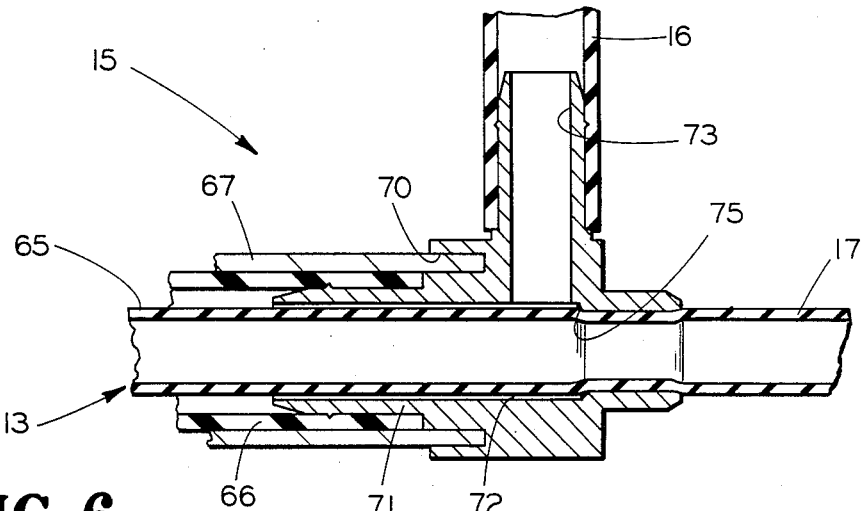
FIG. 6 is a sectional elevational view of the junction block of vehicle seat inflation device illustrated in FIG. 1.

The conduit means 13 is provided to connect the two-way valve assembly 12 with the junction block 15. As illustrated in FIG. 6, the junction block 15 includes a recessed portion 70 for receiving the outer conduit 67 and a cylindrical extension 71 for receiving the second conduit 66 thereabout in air-sealing engagement. The second conduit 66 communicates through a narrow passageway 72 and a large upstanding output passageway 73 to the first output conduit 16. The first conduit 65 passes through a neck portion 75 of the junction block 15 and outwardly therefrom. The neck portion 75 provides an air-tight seal between the first conduit 65 and the junction block 15 so as to prevent air passing through the narrow passageway 72 and the output passageway 73 from escaping. Although the first conduit 65 is illustrated as also comprising the output conduit 17, it will be appreciated that the output conduit 17 can be formed as a separate conduit connected to the first conduit 65 in an air-tight fashion. As previously mentioned, the output conduits 16 and 17 are connected to respective chambers within the vehicle seat adapted to be selectively inflated and deflated.

In operation, a driver of the vehicle rotates the valve plate 37 to a predetermined position so as to inflate or deflate a desired one of the chambers. As shown in FIG. 1, indicia may be provided on the external surfaces of the knob 52 and valve body 20 to aid the driver in selecting the desired position of the valve plate 37. In order to inflate the lumbar chamber, the knob 52 is rotated clockwise relative to the valve body 20, when viewed from above, until the lower member 45 of the valve plate 37 engages the one end portion 27a of the cutout 27. The position of the valve plate 37 shown in FIG. 5 is such that it can be directly superimposed upon the valve spool 18 shown in FIG. 3 to illustrate this first position. When the valve plate 37 is in the first position, the bulb 11 is squeezed by the operator so as to force air through the check valve 31, the input chamber 23, and the first passageway 25 into the valve body chamber 26. The air then passes upwardly through the cutout 27 and the first aperture 40 formed in the valve plate 37 to the relief valve chamber 47. The air then passes downwardly through the second aperture 41 formed in the valve plate 37, the second passageway 28, and the central passageway 63 formed in the valve stem 62 to the first conduit 65. As shown in FIG. 6, the conduit 65 is connected through the output conduit 17 to the lumbar chamber of the vehicle seat. In this manner, the lumbar chamber of the vehicle seat can be inflated by the operator to a desired level.

If it is desired to deflate the lumbar chamber of the vehicle seat, the knob 52 is pushed downwardly against the valve body 20 as illustrated in FIG. 7. Such movement of the knob 52 causes the enlarged head of the screw 53 to be moved downwardly out of air-tight engagement with the O-ring 55. Because this air-tight seal has been released, air from the lumbar chamber is permitted to escape therefrom by passing back through the relief valve chamber 47 and upwardly and out of the relief valve housing 46. When it is desired to stop the deflation of the lumbar chamber, the downward pressure applied to the knob 52 is removed. The spring 56 then moves the knob 52 and the screw 53 upwardly until the enlarged head of the screw sealingly engages the O-ring 55.

In order to inflate or deflate the thigh chamber, the knob 52 is rotated counter-clockwise relative to the valve body 20, when viewed from above, to a second position wherein the lower projection 45 of the valve plate 37 engages the other end 27b of the cutout 27 formed in the valve spool 18. It has been found desirable to form the lower projection 45 and the cutout 27 of appropriate sizes so as to limit the amount of rotation between the first and second positions to ninety degrees. The second position of the valve plate 37 with respect to the valve spool 18 can be visualized by rotating the valve plate 37 illustrated in FIG. 5 ninety degrees counter-clockwise and then superimposing it upon the valve spool 18 illustrated in FIG. 3. When the bulb 11 is squeezed by the driver of the vehicle, air passes through the check valve 31, the input chamber 23, and the first passageway 25 into the valve body chamber 26. The air then passes upwardly through the second aperture 41 formed in the valve plate 37 into the relief valve chamber 47. The air then passes through downwardly through the first aperture 40 formed in the valve plate 37 and the third passageway 30 formed in the valve spool 18 into the output chamber 60. As previously mentioned, the output chamber 60 communicates with the region within the second conduit 66 but without the first conduit 65. As shown in FIG. 6, the air in this region passes through the narrow passageway 72 and the output passageway 73 of the junction block 15 to the output conduit 16 and the thigh chambers of the vehicle seat. Deflation of the thigh chamber is achieved by depressing the knob 52 downwardly toward the valve body 20 as described above.

In accordance with the provisions of the patent statutes, the principal and mode of operation of the present invention have been described and illustrated in its preferred embodiment. However, it must be appreciated that the present invention can be practiced otherwise than as specifically explained and illustrated without departing from its spirit or scope.

What is claimed is:

1. A two-way selector valve adapted to selectively provide communication between a source of pressurized fluid, first and second pneumatic chambers, and the atmosphere comprising:
   a first passageway providing communication between the source of pressurized fluid and a valve chamber;
   a second passageway providing communication between said valve chamber and one of the pneumatic chambers;
   a third passageway providing communication between said valve chamber and the other of the pneumatic chambers;
   rotatable valve plate means disposed in said valve chamber for providing communication between said first passageway and a selected one of said second and third passageways for inflating the corresponding pneumatic chamber; and
   relief valve means mounted for rotation with said valve plate means and movable relative thereto for selectively providing communication between said selected one of said second and third passageways and the atmosphere for deflating the corresponding pneumatic chamber.

2. The invention defined in claim 1 wherein said first passageway terminates in a cutout portion and said valve plate means includes a projection adapted to extend into said cutout portion to limit the amount of rotation of said valve plate means.

3. The invention defined in claim 2 wherein said cutout is formed in the shape of an annular segment.

4. The invention defined in claim 1 further including valve actuator means for rotating said valve plate means.

5. The invention defined in claim 4 wherein said valve actuator means includes a pair of downwardly-extending projections adapted to cooperate with a pair of upwardly-extending projections formed on said valve plate means such that rotation of said valve actuator means causes rotation of said valve plate means.

6. The valve defined in claim 4 wherein said relief valve means includes a passageway formed through said valve actuator means providing communication between said valve chamber and the atmosphere and means for selectively preventing communication through said valve actuator passage.

7. The invention defined in claim 6 wherein said means for preventing said communication through said valve actuator passage includes a screw having an enlarged head portion slidably disposed in said valve actuator passage and means for urging said enlarged head portion into engagement with said valve actuator means so as to prevent communication through said valve actuator passage.

8. The invention defined in claim 7 wherein said screw is threaded into engagement with a control knob and said means for uring includes a spring disposed between said relief valve means and said control knob.

9. A two-way selector valve adapted to selectively provide communication between a vehicle seat inflation device having first and second pneumatic chambers disposed therein, a source of pressurized fluid, and the atmosphere, comprising:
- a valve body including an aperture, a valve chamber, and an output chamber;
- a valve spool having an input chamber formed in one end thereof adapted to communicate with the source of pressurized fluid and another end adapted to be inserted in said valve body aperture, said valve spool including a first passageway providing communication between said input chamber and said valve body chamber, a second passageway providing communication between said valve body chamber and a passageway formed in a valve stem connected to said valve spool, and a third passageway providing communication between said valve body chamber and said output chamber;
- first conduit means providing communication between said valve stem passageway and one of the pneumatic chambers;
- second conduit means providing communication between said output chamber and the other of the pneumatic chambers; and
- rotatable valve plate means disposed in said valve body chamber for providing communication between said first passageway and a selected one of said second and third passageways for inflating the corresponding pneumatic chamber.

10. The invention defined in claim 9 further including check valve means disposed in said input chamber for permitting one-way flow of fluid from the source of pressurized fluid into said first passageway.

11. The invention defined in claim 10 wherein said first conduit means is disposed coaxially within said second conduit means and further including a junction block connected to said first and second conduit means for providing communication to respective first and second output conduit means, said first and second output conduit means not being disposed coaxially with respect to one another.

12. The invention defined in claim 11 wherein said junction block includes a narrow passageway and a neck portion through which said first conduit means is adapted to extend into communication with said first output conduit means, a cylindrical extension adapted to receive said second conduit means so as to provide communication with said narrow passageway, and an output passageway providing communication between said narrow pasageway and said second output conduit means, said neck portion preventing communication out of said narrow passageway.

13. The invention defined in claim 9 wherein said first passageway terminates in a cutout portion and said valve plate means includes a projection adapted to extend into said cutout portion to limit the amount of rotation of said valve plate means.

14. The invention defined in claim 13 wherein said cutout portion is formed in the shape of an annular segment.

15. The invention defined in claim 9 further including valve actuator means for rotating said valve plate means.

16. The invention defined in claim 15 wherein said valve actuator means includes a housing threaded into said valve body chamber and a valve actuator rotatably supported within said housing, said valve actuator including a pair of downwardly-extending projections adapted to cooperate with a pair of upwardly-extending projections formed on said valve plate means such that rotation of said valve actuator causes rotation of said valve plate means.

17. The invention defined in claim 16 further including relief valve means mounted for rotation with said valve plate means for selectively providing communication between said selected one of said second and third passageways for deflating the corresponding pneumatic chamber.

18. The invention defined in claim 17 wherein said relief valve means includes a passageway formed through said valve actuator providing communication between said valve chamber and the atmosphere and means for selectively preventing communication through said valve actuator passage.

19. The invention defined in claim 18 wherein said means for preventing said communication through said valve actuator passage includes a screw having an enlarged head portion slidably disposed in said valve actuator passage and means for urging said enlarged head portion into engagement with said valve actuator so as to prevent communication through said valve actuator passage.

20. The invention defined in claim 19 wherein said screw is threaded into engagement with a control knob and said means for urging includes a spring disposed between said relief valve means and said control knob.

21. A two-way selector valve adapted to selectively provide communication between a means for selectively supplying pressurized fluid, first and second pneumatic chambers, and the atmosphere comprising:
- a first passageway in communication with the means for selectively supplying pressurized fluid and with a valve chamber;
- a second passageway in communication with the first pneumatic chamber;
- a third passageway in communication with the second pneumatic chamber;
- rotatable valve plate means disposed in said valve chamber for providing communication between said valve chamber and a selected one of said second and third passageways; and
- relief valve means mounted for rotation with said valve plate means and movable relative thereto for selectively providing communication between said valve chamber and the atmosphere to deflate the selected chamber.

22. The invention defined in claim 21 wherein said first passageway terminates in a cutout portion and said valve plate means includes a projection adapted to extend into said cutout portion to limit the amount of rotation of said valve plate means.

23. The invention defined in claim 22 wherein said cutout is formed in the shape of an annular segment.

24. The invention defined in claim 21 further including valve actuator means for rotating said valve plate means.

25. The invention defined in claim 24 wherein said valve actuator means includes a pair of downwardly-extending projections adapted to cooperate with a pair of upwardly-extending projections formed on said valve plate means such that rotation of said valve actuator means causes rotation of said valve plate means.

26. The invention defined in claim 24 wherein said relief valve means includes a passageway formed through said valve actuator means providing communication between said valve chamber and the atmosphere and means for selectively preventing communication through said valve actuator passage.

27. The invention defined in claim 26 wherein said means for preventing said communiation through said valve actuator passage includes a screw having an enlarged head portion slidably disposed in said valve actuator passage and means for urging said enlarged head portion into engagement with said valve actuator means so as to prevent communication through said valve actuator passage.

28. The invention defined in claim 27 wherein said screw is threaded into engagement with a control knob and said means for urging includes a spring disposed between said relief valve means and said control knob.

* * * * *